(12) United States Patent
Petronelli

(10) Patent No.: US 8,385,915 B2
(45) Date of Patent: Feb. 26, 2013

(54) SERVICE PROVIDER IDENTIFIER

(75) Inventor: Anthony Paul Petronelli, San Jose, CA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1973 days.

(21) Appl. No.: 11/182,895

(22) Filed: Jul. 15, 2005

(65) Prior Publication Data

US 2007/0015507 A1    Jan. 18, 2007

(51) Int. Cl.
*H04W 4/00* (2009.01)

(52) U.S. Cl. .......... 455/432.1; 455/414.1; 455/418; 455/432.2; 455/432.3; 455/433; 455/435.1; 455/435.2; 455/435.3; 455/566; 370/310.2; 370/328; 370/338; 370/351; 370/352; 370/353; 370/354; 370/355; 370/356; 379/220.01; 379/221.01; 379/221.14; 379/272; 379/273

(58) Field of Classification Search ........... 455/414.1, 455/418, 432.1, 432.2, 432.3, 433, 435.1, 455/435.2, 435.3, 566; 370/310.2, 328, 338, 370/351–356; 379/220.01, 221.01, 221.14, 379/272–273
See application file for complete search history.

(56) References Cited

U.S. PATENT DOCUMENTS

| | | | |
|---|---|---|---|
| 4,191,860 A | | 3/1980 | Weber |
| 5,003,584 A | | 3/1991 | Benyacar et al. |
| 5,146,491 A | | 9/1992 | Silver et al. |
| 5,184,345 A | | 2/1993 | Sahni |
| 5,187,710 A | | 2/1993 | Chau et al. |
| 5,199,062 A | | 3/1993 | Von Meister et al. |
| 5,608,788 A | * | 3/1997 | Demlow et al. .......... 379/142.07 |
| 5,742,667 A | * | 4/1998 | Smith ....................... 379/112.09 |
| 5,862,203 A | * | 1/1999 | Wulkan et al. ............ 379/114.02 |
| 5,862,471 A | * | 1/1999 | Tiedemann et al. .......... 455/406 |
| 5,884,193 A | * | 3/1999 | Kaplan ........................ 455/565 |
| 5,915,214 A | * | 6/1999 | Reece et al. ................. 455/406 |
| 5,983,092 A | * | 11/1999 | Whinnett et al. ............ 455/406 |
| 6,101,379 A | * | 8/2000 | Rahman et al. .............. 455/406 |
| 6,195,543 B1 | * | 2/2001 | Granberg ..................... 455/407 |
| 6,347,224 B1 | * | 2/2002 | Smyth et al. ................. 455/406 |
| 6,353,664 B1 | * | 3/2002 | Cannon et al. ............. 379/142.1 |
| 6,411,693 B1 | * | 6/2002 | McKeeth ..................... 379/130 |
| 6,570,973 B1 | * | 5/2003 | Boughman et al. ...... 379/207.02 |
| 6,690,929 B1 | * | 2/2004 | Yeh ............................. 455/406 |
| 6,718,025 B2 | * | 4/2004 | Boughman et al. ...... 379/207.02 |
| 6,954,526 B1 | * | 10/2005 | Glenn et al. .............. 379/220.01 |
| 6,981,143 B2 | * | 12/2005 | Mullen et al. ................. 713/166 |
| 7,206,570 B2 | * | 4/2007 | Voehringer ................... 455/407 |
| 7,269,408 B2 | * | 9/2007 | Gruchala et al. ............. 455/406 |
| 7,653,388 B2 | * | 1/2010 | Baba et al. ................... 455/433 |
| 2003/0002524 A1 | * | 1/2003 | Feldman et al. .............. 370/465 |

(Continued)

OTHER PUBLICATIONS

Toll Free Call Service for Calling Collect, Additional Features, http://www.ultracall.co.jp/eng/freecall/freecall_srv.html, retrieved May 27, 2005, 2 pages.

*Primary Examiner* — Steve D Agosta
(74) *Attorney, Agent, or Firm* — Jackson Walker L.L.P.

(57) ABSTRACT

A disclosed method for providing service provider information to a user communication device includes determining a telecommunications service provider associated with a targeted node such as a called party telephone number. An indicator of the telecommunications service provider is provided to and displayed by the user communication device. Communication services available to the communication device are then determined based at least in part on the identity of the telecommunications service provider. Indications of the available communication services may be presented to the communication device by audible or visual signals.

19 Claims, 4 Drawing Sheets

U.S. PATENT DOCUMENTS

2003/0112932 A1* 6/2003 Johnston ................. 379/114.01
2004/0053618 A1* 3/2004 Leppanen et al. ............ 455/445
2005/0261003 A1* 11/2005 Fiedler et al. .............. 455/456.1
2007/0049329 A1* 3/2007 Mayer et al. ............... 455/552.1

* cited by examiner

SERVICE PROVIDER IDENTIFIER

FIELD OF THE INVENTION

The present invention relates in general to the field of real time information provisioning to customers.

DESCRIPTION OF THE RELATED ART

Telephone communication systems and networks provide voice telephony, messaging and data communications services worldwide. Communication networks that handle person to person audio traffic carry more than just voice information that may be useful to communication systems users on a real time basis. Currently information such as the cost of the call or other variable costs associated with inter-network calling are not readily accessible to communication systems users. There is a need for methods and apparatus that can provide more information to communication systems users on a real-time or near real-time basis. Additionally, what is needed is methodologies and apparatus that provide information useful to call management in near real-time so that users may make resource decisions during or prior to communication connection.

SUMMARY OF THE INVENTION

The present invention provides methods, systems and apparatus for providing service provider information for a user communication device. A targeted communication link associated with a target service provider is determined using a user communication device associated with a user service provider. The determination of the indicator for the target service provider may be with a user service provider Central Office (CO) or server. An indicator of the target service provider is received and displayed on the user communication device. Communication services available to the communication device are determined and presented to the communication device by audible or visual signals. Representations of services available or restricted to the user communication device are provided to the user device. Restricted services may be enabled by override options.

Examples of the more important features of the invention have been summarized (albeit rather broadly) in order that the detailed description thereof that follows may be better understood and in order that the contributions they represent to the art may be appreciated. There are, of course, additional features of the invention that will be described hereinafter and which will form the subject of the claims appended hereto.

BRIEF DESCRIPTION OF THE FIGURES

Features of the present invention will become apparent from the following detailed description considered in connection with the accompanying drawings disclosing embodiments of the present invention. It should be understood, however, that the drawings are designed for the purpose of illustration only and not as a definition of the limits of the invention. For a detailed understanding of the present invention, references should be made to the following detailed description of an exemplary embodiment, taken in conjunction with the accompanying drawings, in which like elements have been given like numerals in the drawings, wherein similar reference characters denote similar elements throughout the several views.

Figure 1:
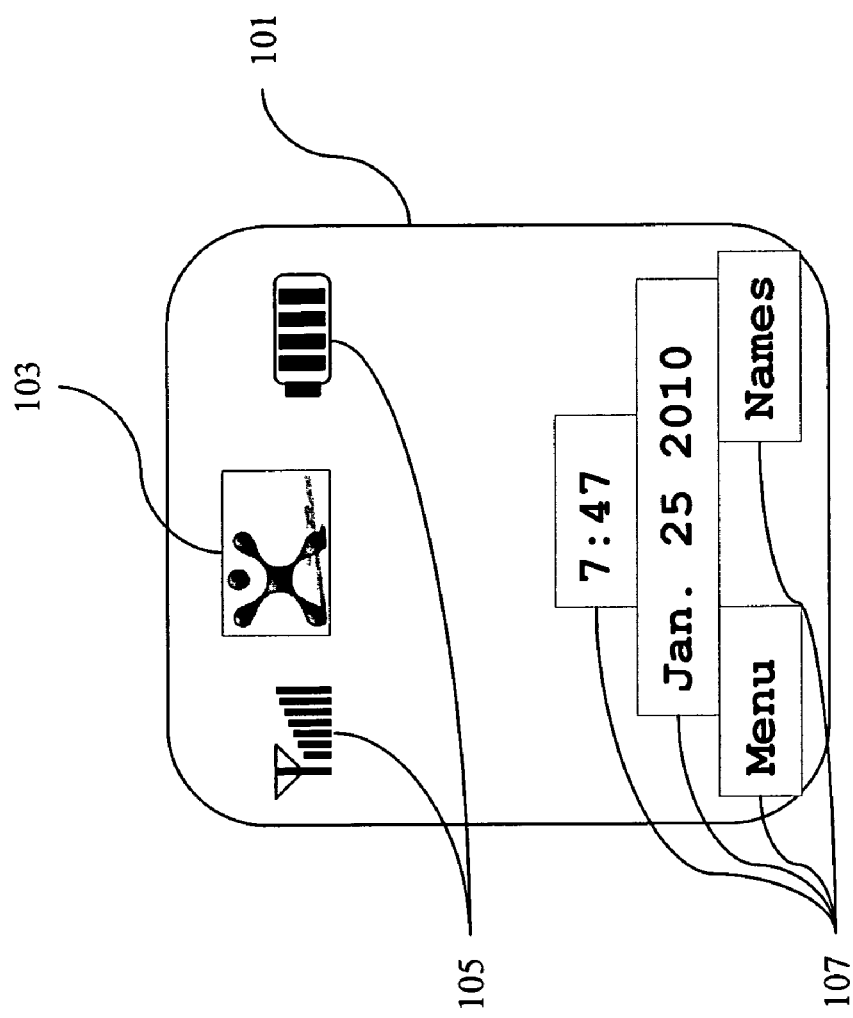
FIG. 1 illustrates an example of a display provided by the present invention.

While the invention will be described in connection with its preferred embodiments, it will be understood that the invention is not limited thereto. It is intended to cover all alternatives, modifications, and equivalents that may be included within the spirit and scope of the invention, as defined by the appended claims.

DETAILED DESCRIPTION OF THE INVENTION

In view of the above, the present invention through one or more of its various aspects and/or embodiments is presented to provide one or more advantages, such as those noted below. The present invention provides for provisioning real-time information and services to communication system users.

The present invention provides methods, systems and apparatus for providing service provider information for a user communication device. For example, a visual or audible indicator may appear on a caller's cellular telephone, the indicator representing the service provider of the person or device being called. More generally, a targeted communication link associated with a target service provider is determined using a user communication device associated with a user service provider. The determination of the indicator for the target service provider may be with a user service provider Central Office or server. An indicator of the target service provider is received and displayed on the user communication device. Communication services available to the communication device are determined and presented to the communication device by audible or visual signals. Representations of services available or restricted to the user communication device are provided to the user device. Restricted services may be enabled by override options.

The present invention provides systems, apparatus, or methods for providing communications services to end user communication devices using one or a plurality of service providers. Any such service provider may be a Wide Area Network (WAN) or cellular communication system. Cellular services include analog cellular service, digital cellular service, communication service providers using Code Division Multiplex Access (CDMA) technologies, two-way paging, etc. These systems are often combined with the Public Switched Telephone Network (PSTN) or other communication systems including data networks. These systems in combination, all examples of Wide Area Networks (WANs), provide communications services over wide geographic areas.

The procedures for determining what services may be required, available, selected, and used by a user of a communication device are often dependent on information that must be obtained from the service provider for a party being called.

One aspect of the invention disclosed is a method for determining communication services for a communications device where such services are selected from a plurality of services depending on the identity or an indicator associated with a communications service provider. This method may be practiced at an initiating communications unit or device, though the method may also be utilized or provided by or in conjunction with a communications service provider. Communication devices include but are not limited to telephones, mobile or cellular telephones, Personal Digital Assistants (PDAs), computers or any other device that may be used to enable targeted or received communications and that may be used to provide, establish or complete a communication link. For the purposes of this invention a targeted communication link means any device or communication node as commonly accepted in the art to which a data or voice communication link or connection may be established.

After initiating communication to a targeted communication link (for example, a called party or a communication device being engaged) using a communication device, a user communication device receives a service provider indicator associated with the targeted link at the communications device or through an associated communications server. This step of receiving may include receiving an indicator of the targeted communication link's service provider (e.g., callee's, or called party's, service provider) and associated information (Uniform Resource Locator, Phone number, Internet Protocol (IP) or other address, IP port number, or other information needed to contact or identify the targeted communication link). The targeted service provider indicator is used to determine services available or restricted to the communication device from the user's service provider, as well as cost structures for the available services.

The method and apparatus of the present invention provides for an indicator useful with a communication device, for example a wireless phone or PDA. The indicator may be an audible or visual prompt or icon that provides information by virtue of its presence, the time of its appearance, or by virtue of characteristics of the indicator. The indicator may be an audio or visual 'pop-up.' The indicator is useful for indicating whether the user's service provider for the user's communication service is the same service provider used by the callee. The invention provides for indicating incoming/outgoing same service providers, and may indicate whether the call is free, or what costs may be associated with the communication.

The indicator is present for the outgoing call, and the indicator may be initiated in the communication device as the call is initiated, or before the connection is completed, or after the call in connected. An indicator may be provided to identify the service provider of the targeted communication link, for example, a called party.

The method and apparatus of the present invention provides for an audio/visual interruption or "barge-in" to a targeted communication link that will inform a called party or called communication device, link or node that a caller has the same service provider as the called party. The options and features provided by the present may be turned on or off using a user interface on a user communication device, or optionally, the options and features may be turned on or off, or otherwise provisioned, by a service provider.

An advantage to knowing whether a party called has the same service provider is that service plans may allow for cost free or reduced rate calling between callers subscribing or belonging to the same service provider. For example, some service providers have rate plans that provide that charges for calling/communication minutes do not accrue for an account for talking to a party with same service provider for networked calls (i.e., in-network calls). Because in-network calling is free under some service provider service plans, users want to know calls that are in the network to enable users to manage their communication resources efficiently. Further, the invention provides for counting minutes, both 'free' and those minutes that are not free.

The method and apparatus of the present invention provides modes indicating in-network or out of network communication, or in-service or out of service communication. The present invention also provides other modes that indicate which services are available. For example, the available no-charge minutes available to the communication device may be tracked on the device or on a service provider Central Office, server or database. A warning indicator may be provided when no-charge minutes are in the 10-25% remaining range. This information and these services may be indicated by audible or visual prompts provided to the user communication device. The indicators may preferably occur prior to connecting to the targeted communication link so that a user may have information to decide whether, when to initiate or how long to maintain a communication. The indicators are optionally available and may be turned off and on.

Restrictions to services available to a communication device may be based on the service provider indicated for the targeted communication link. Restrictions to services available may also be based also on whether or not minutes in a plan are available, and so calls are restricted to in-network calls when no more charge-free time is available under a rate plan. A restriction to usage of the communication device may be parentally controlled so that children of a primary account holder only talk to in-network ("free") customers. Internet access may be blocked, and certain numbers or groups of numbers may be restricted. Restrictions may be based on time and place.

While the visual signals like icons, or audible signals, may indicate the identity of the service provider for the targeted communication link, indications may also simply notify whether the provider is in-service (i.e., in-network) or out-of-service. The representations of the service provider indicator may be based on user criteria and business needs. Outgoing calls may be limited to in-network, incoming communications may be limited to in-network sources and these restrictions may be optionally overridden by an override feature. An override feature may be turned on or off from a user communication device user interface like an operating system. Communication restrictions outside of the same network may be overridden based a feature/option such as an alphanumeric code to be input (like 3 digits). The override options and their timing may be monitored and/or stored by the communication device or on an associated server. Based on a preplanned service budget and optionally a billing cycle or the number of minutes used during a billing cycle, the communication device signals the user with these conditions and/or stores the information for retrieval. Examples of communication statistics associated with service providers service plans include shared minutes, family minutes, in network minutes and free minutes. The present invention provides for blocking or denying a connection to calls from out-of-service provider sources that would engender toll charges.

Restrictions to services, which may be termed 'restricted services' provided to the communication device may be based on the indicator of the service provider of the targeted communication link associated with information stored on the communication device or on a server associated with the communication device or a server associated with the user's service provider. Examples of restricted services include the restrictions to usage or service as explained above, allowing only communications between communication devices with a common service provider, blocking calls initiated from an out-of-service provider, denying a connection for a communication from an out-of-service provider, blocking calls from out-of-service providers based on whether or how many minutes are available under a user's service plan. To determine availability of minutes left on a service plan's budget, data used to determine whether or not the user minutes may or may not be on the server, but can be downloaded to the communication device automatically or by user request.

FIG. 1 illustrates an example of a screen or display 101 presentation which includes iconic service indicators 105. A screen presentation can also include alphanumerically represented information 107, for example date, time and available options/services. An icon 103 indicating the service provider for the targeted communication link, or an indicator of the service provider for an incoming communication. Alternatively, icon 103 may be substituted with a name or alphanumeric symbol representing the service provider for the targeted link or the incoming communication. The icon or alphanumeric symbol may be color coded to represent service provider status as well as services that may be available to the communication device based the service provider indicator. For example, whether the other service provider is in-network or out-of-network can be color coded. For example the icon can be colored red if the caller/callee is not within the network, and green for a caller/callee within the network. A combination of color coded icons or alphanumeric symbols, which may be red or green, or even a red dot, may indicate what service provider the other calling party is with, or merely whether the other service provider is in-network. These visual or audible indicators may be used with any communication devices whether wired or wireless, mobile or cellular telephones, PDAs, computers, etc. Examples of information provided to the communication device based on the other service provider indicator include portage charges and transfer fees for VoIP. When one network user incurs a charge from the network servicing the targeted communication link, a symbol or audible representation may be represented on the user's communication device. There might be a charge involved that would be indicated by the present invention, and before a connection that would incur charges is made or caller identification information forwarded to the callee, the user can make a decision not to initiate or maintain any communication.

Figure 2:
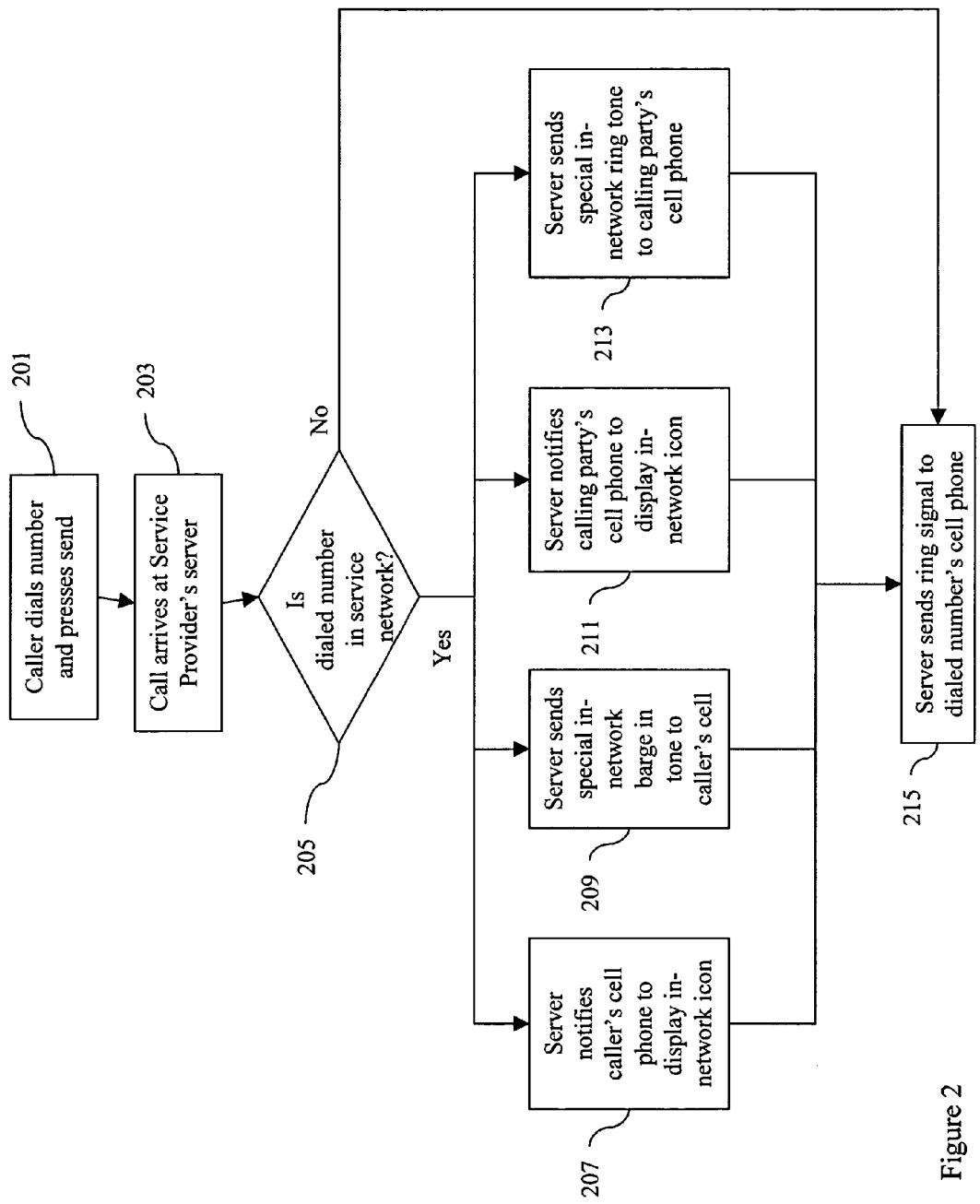
FIG. 2 illustrates a flow chart for an embodiment provided by the present invention.

FIG. 2 illustrates a flowchart relating to communication and icon display methods provided by the present invention. A communication device is employed to initiate contact with a targeted communication link 201, for example when a caller dials a number from the caller's telephone and initiates a communication to another telephone device. The communication request is received the user's service provider 203. A determination is made whether the targeted communication link is in-network or not 205, for example by answering a question equivalent to "Is the dialed number in the (caller's) service provider network?" If the targeted communication is not in-network, the icon 103 or audible signal represents the targeted communication link is out-of-network, and may even indicated the identity of the out-of-network service provider. A special audio tone or visual signal may be initiated on the user's communication device prior to a communication connection being made so that the communication may be aborted if the user desires. The audio tone or visual signal may represent that the targeted communication link service provider is out-of-network.

As further illustrated in FIG. 2, when the call is in-network 205 (i.e., Yes) there are non-exclusive options provided by the present invention. Any or all of these options may be enabled contemporaneously. The server notifies the user's communication device (like the caller's cell phone) that the targeted communication link is in-network. The user's communication device may then display an in-network icon or initiate an in-network audible signal 207. Alternatively, or contemporaneously, the server sends a special in-network barge-in signal to user's communication device 209. This may indicate that the targeted communication is engaged in such a manner as to preclude connection. Another option is that the server notifies the user's communication device (i.e., the calling party's cell phone) to display the in-network icon 211 or initiate an audible tone. Also, a server may send a special in-network signal to the user's communication device to enable an in-network associated ring-tone 213. After these options, the connection from the user's communication device to the targeted link may be completed 215, for example by sending a ring signal to the dialed number's cell phone.

Figure 3:
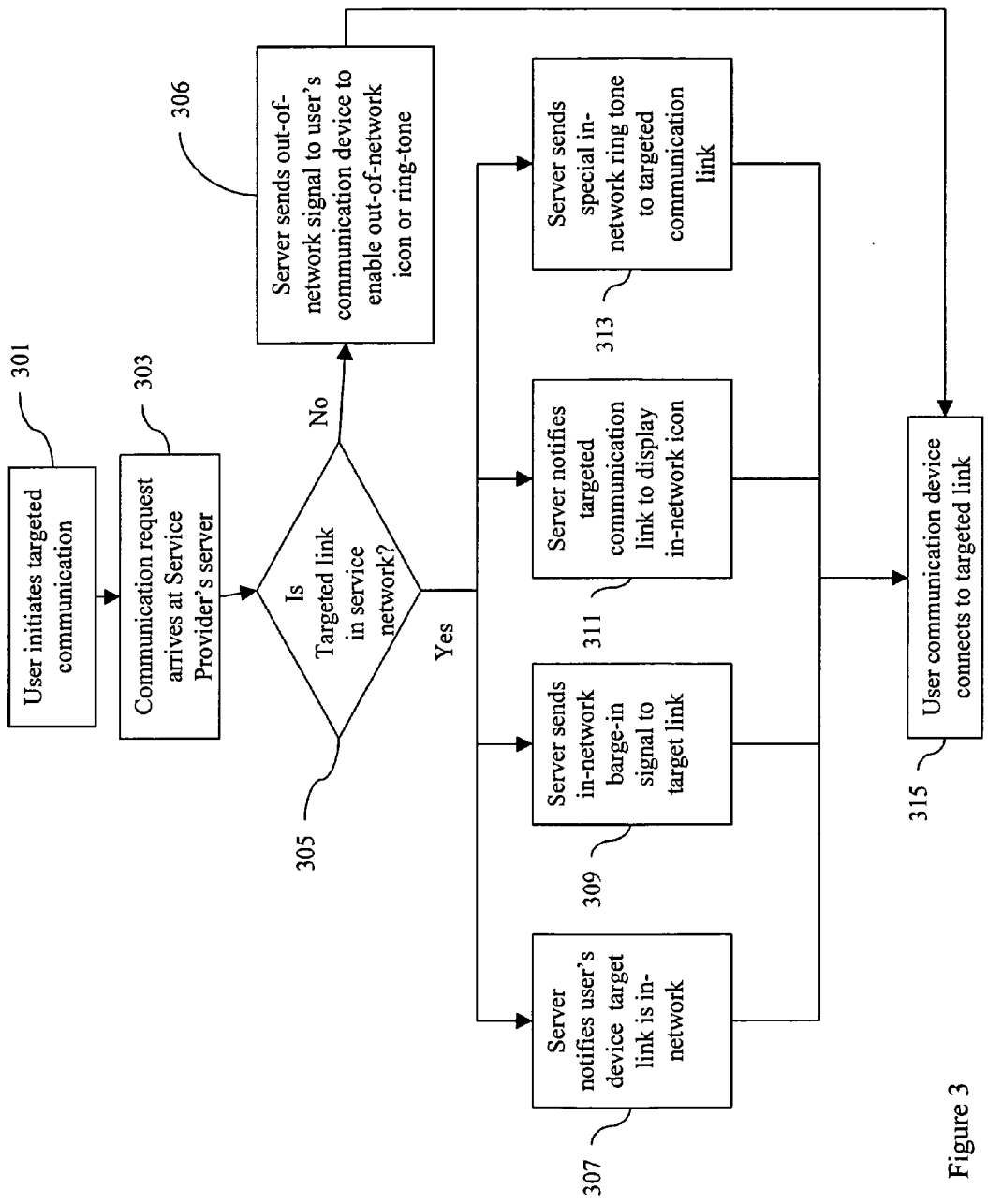
FIG. 3 illustrate a flow chart for an embodiment provided by the present invention.

FIG. 3 illustrates a flowchart relating to several methods or aspects of the present invention. A user communication device is employed to transfer information from a user communication device to a targeted communication link 301. As described previously, a communication device for a sending or receiving party includes a telephone, mobile or cellular telephone, PDA, computer or any other device that may be used to enable targeted or received communications. A communication request is received by the user's service provider 303, for example in a Central Office associated server, wherein the server comprises at least one processor and may be connected to a database. A determination is made whether the targeted communication link is in-network or not 305, that is, whether the user service provider is the target service provider. If the targeted communication is not in-network, the icon 103 or audible signal represents the targeted communication link is out-of-network to the user's communication device 306, and may even indicate the identity of the out-of-network service provider. A special audio tone may be initiated prior to a communication connection being made so that the communication may be aborted if the user desires. The audio tone may represent that the targeted communication link service provider is out-of-network.

Thus, the calling party using a communication device can see or hear whether they are calling to a party or device in-network or not. The person or party receiving the call with the present invention can tell based on looking at their communication device when the call comes in, if the call is in the network, or a special ring or iconic representation may be indicative of an in-network call. A special tone that occurs before the communication device notifies the user of the incoming communication (e.g., a telephone actually starts ringing or a data or voice connection actually occurs) indicates whether or not the call is in network. This feature may be used along with 'barge-in' so that if a communication device is otherwise exclusively engaged, an incoming communication may be indicated and whether the incoming communication service provider is in-network or not. Central Office call signals (barge-ins) may be audibly played by the CO, for example to a communication device earpiece. The in- or out-of-network audible indicators may be played by the user communication device as a ring-tone when no communication is occurring, or optionally during communication as well.

When a call is determined not to be in-network, the service provider's Central Office or server can ping back to the caller with the in-service network indicator of the targeted communication link prior to actual connection. This way a user's identity information ("caller ID") does not have to be transmitted to a communication link, which may be a concern to a user. Optionally, the invention provides for determining whether to continue the communication or not, for example by having the communication device voice activated or to option to hit a button to enable the connection to continue. The communication device may indicate the targeted communication link is not in-network, the user may use an audible or physical/electronic signal (e.g., the '#' key or similar) to continue. Optionally also, the only time ping back occurs is when the targeted communication link is not in-network.

As further illustrated in FIG. 3, when the call is in-network 305 (i.e., Yes) there are non-exclusive variations provided by the present invention which may occur separately and/or contemporaneously. In one aspect of the present invention the server notifies the user's communication device that the targeted communication device is in-network 307. The user's communication device may then display an in-network icon or initiate an in-network audible signal. Also, the server may send a special in-network barge-in signal to the targeted communication link 309. In still another embodiment, the server notifies the targeted communication link to display the in-network icon 311 or initiates an audible tone to the calling party communication device. Another option is for a server to send a special in-network signal to the targeted communication link to enable an iconic symbol and/or in-network associated ring-tone 313. After these options, the connection from the user's communication device to the targeted link may be completed 315.

Services that may be determined based on the service provider indicator include identifying a calling party, restricting information transfer unless the target service provider is the user service provider; identifying available no charge minutes; and restricting calls to in-network based on available minutes.

Figure 4:
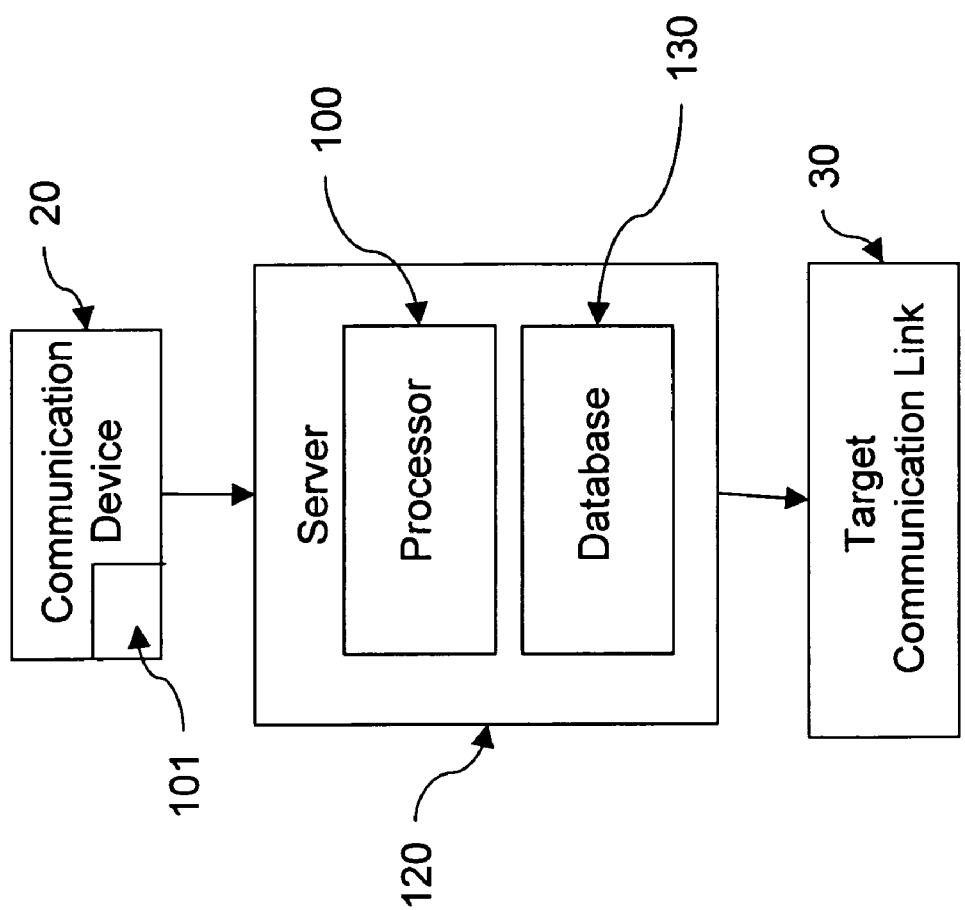
FIG. 4 illustrates a flow chart of a system provided by the present invention.

FIG. 4 illustrates a flow chart relative to a device or appliance configurations for a system according to the present invention. A communication device 20, which may be a user communication device having a screen or display 101, communicates with a service provider's server 120, which may comprise at least one processor 100 and a database 130, and which service provider's server 120 may be located in the service provider's Central Office. The server may also communicate with a target communication link 30.

Accordingly, while embodiments of the present invention have been shown and described, it is to be understood that many changes and modifications may be made thereunto without departing from the spirit and scope of the invention as defined in the appended claims.

The present invention described herein is well adapted to carry out the objects and attain the ends and advantages mentioned, as well as others inherent therein. While various embodiments of the invention have been given for purposes of disclosure, numerous changes exist in the details of procedures for accomplishing the desired results. Various modifications will be apparent to those skilled in the art. It is intended that all variations within the scope and spirit of the appended claims be embraced by the foregoing disclosure.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

What is claimed is:

1. A method of providing information to a communication device comprising:
   (a) determining a telecommunications service provider corresponding to a called party telephone number;
   (b) determining an indicator of the telecommunications service provider;
   (c) providing the indicator to the user communication device; and
   (d) determining according to the indicator, communication services available to the user communication device.

2. The method of claim 1 further comprising providing to the user communication device an indication of the communication services available.

3. A method of providing information to a communication device comprising:
   (a) determining a telecommunications service provider corresponding to a called party telephone number;
   (b) determining an indicator of the telecommunications service provider; and
   (c) providing the indicator to the user communication device;
   wherein providing the indicator further comprises providing at least one signal selected from the group consisting of: i) a visual signal, and ii) an audible signal.

4. A method of providing information to a communication device comprising:
   (a) determining a telecommunications service provider corresponding to a called party telephone number;
   (b) determining an indicator of the telecommunications service provider;
   (c) providing the indicator to the user communication device; and
   (d) using a user service provider's processor for determining the indicator of the telecommunications service provider.

5. A method of providing information to a communication device comprising:
(a) determining a telecommunications service provider corresponding to a called party telephone number;
(b) determining an indicator of the telecommunications service provider;
(c) providing the indicator to the user communication device; and
(d) determining services available to the user communication device using at least one device selected from the group consisting of: i) a user service provider's processor and ii) the user communication device.

6. The method of claim 5 wherein the services available to the user communication device comprise restricted services.

7. The method of claim 6 wherein the restricted services are enabled by a user override feature.

8. A method of providing information to a communication device comprising:
(a) determining a telecommunications service provider corresponding to a called party telephone number;
(b) determining an indicator of the telecommunications service provider; and
(c) providing the indicator to the user communication device;
wherein the determining of the indicator of the telecommunications service provider and the providing of the indicator to the communication device is performed by a user service provider Central Office.

9. A method of providing information to a communication device comprising:
(a) determining a telecommunications service provider corresponding to a called party telephone number;
(b) determining an indicator of the telecommunications service provider;
(c) providing the indicator to the user communication device; and
(d) at least one of the group consisting of i) comparing the telecommunications service provider with a telecommunications service provider corresponding to a telephone number of the user communication device, ii) restricting information transfer unless the called party telecommunications service provider and a telecommunications service provider corresponding to a telephone number of the user communication device are the same; iii) identifying available no-charge minutes; and iv) restricting calls to in-network based on available minutes.

10. A system for providing information to a communication device, the system including a processor operable to:
(a) determine a telecommunications service provider corresponding to a called party telephone number;
(b) determine an indicator of the telecommunications service provider; and
(c) present the indicator of the target service provider on the communication device.

11. The system of claim 10 wherein the processor is further operable to
determine, according to the indicator of the telecommunications service provider, communication services available to the communication device.

12. The system of claim 11 wherein the processor is further operable to
provide to the communications device an indication of the communication services available.

13. The system of claim 11 wherein the services available to the communication device comprise restricted services.

14. The system of claim 13 wherein the restricted services are enabled by an override feature.

15. The system of claim 11 wherein presenting the indicator of the telecommunications service provider comprises initiating an audible signal.

16. The system of claim 11 wherein presenting the indicator of the telecommunications service provider comprises initiating a visual signal.

17. The system of claim 10 wherein the system comprises a portion of
a Central Office associated with a telecommunications service provider corresponding to the communication device.

18. A wireless communication device operable to:
initiate a call to a called party telephone number;
receive an indication of a telecommunications service provider corresponding to the called party telephone number;
present the indication to a user of the wireless communication device; and
perform an action based at least in part on whether the called party telecommunications service provider and a telecommunications service provider corresponding to the wireless communication device are the same.

19. The wireless communication device of claim 18, wherein the action includes at least one action selected from the group consisting of: indicating available in network minutes when the telecommunications service providers are the same and restricting communication to the called party when the telecommunications service providers differ.

* * * * *